(12) United States Patent
Kishi et al.

(10) Patent No.: US 12,169,183 B2
(45) Date of Patent: Dec. 17, 2024

(54) MEASURING DEVICE

(71) Applicant: SINTOKOGIO, LTD., Nagoya (JP)

(72) Inventors: Nobusato Kishi, Nagoya (JP);
Kazunori Ogura, Nagoya (JP)

(73) Assignee: SINTOKOGIO, LTD., Aichi (JP)

(*) Notice: Subject to any disclaimer, the term of this patent is extended or adjusted under 35 U.S.C. 154(b) by 297 days.

(21) Appl. No.: 17/828,320

(22) Filed: May 31, 2022

(65) Prior Publication Data
US 2023/0003588 A1   Jan. 5, 2023

(30) Foreign Application Priority Data

Jun. 30, 2021   (JP) ................................ 2021-109540

(51) Int. Cl.
| | | |
|---|---|---|
| *G01N 25/58* | (2006.01) | |
| *G01N 5/00* | (2006.01) | |
| *G01N 5/04* | (2006.01) | |
| *G01N 25/00* | (2006.01) | |

(52) U.S. Cl.
CPC ............ *G01N 25/58* (2013.01); *G01N 5/00* (2013.01); *G01N 5/04* (2013.01); *G01N 25/00* (2013.01)

(58) Field of Classification Search
CPC ............ G01N 5/00; G01N 5/04; G01N 25/00
See application file for complete search history.

(56) References Cited

U.S. PATENT DOCUMENTS

| | | | |
|---|---|---|---|
| 2020/0292431 A1* | 9/2020 | Kumazaki | ............... G01N 5/04 |
| 2021/0055194 A1* | 2/2021 | Takashima | ............... G01N 5/04 |
| 2021/0131936 A1* | 5/2021 | Tomita | ..................... G01N 5/04 |

FOREIGN PATENT DOCUMENTS

JP          2004-85224 A       3/2004

* cited by examiner

*Primary Examiner* — Mirellys Jagan
(74) *Attorney, Agent, or Firm* — Harness, Dickey & Pierce, P.L.C.

(57) ABSTRACT

A measuring device includes: a support which supports a measurement target object; a furnace which heats the measurement target object; an elevating mechanism which moves the furnace; and an electronic balance which measures the weight of the measurement target object, the elevating mechanism moving the furnace so that the measurement target object which is supported by the support is housed in the furnace.

13 Claims, 10 Drawing Sheets

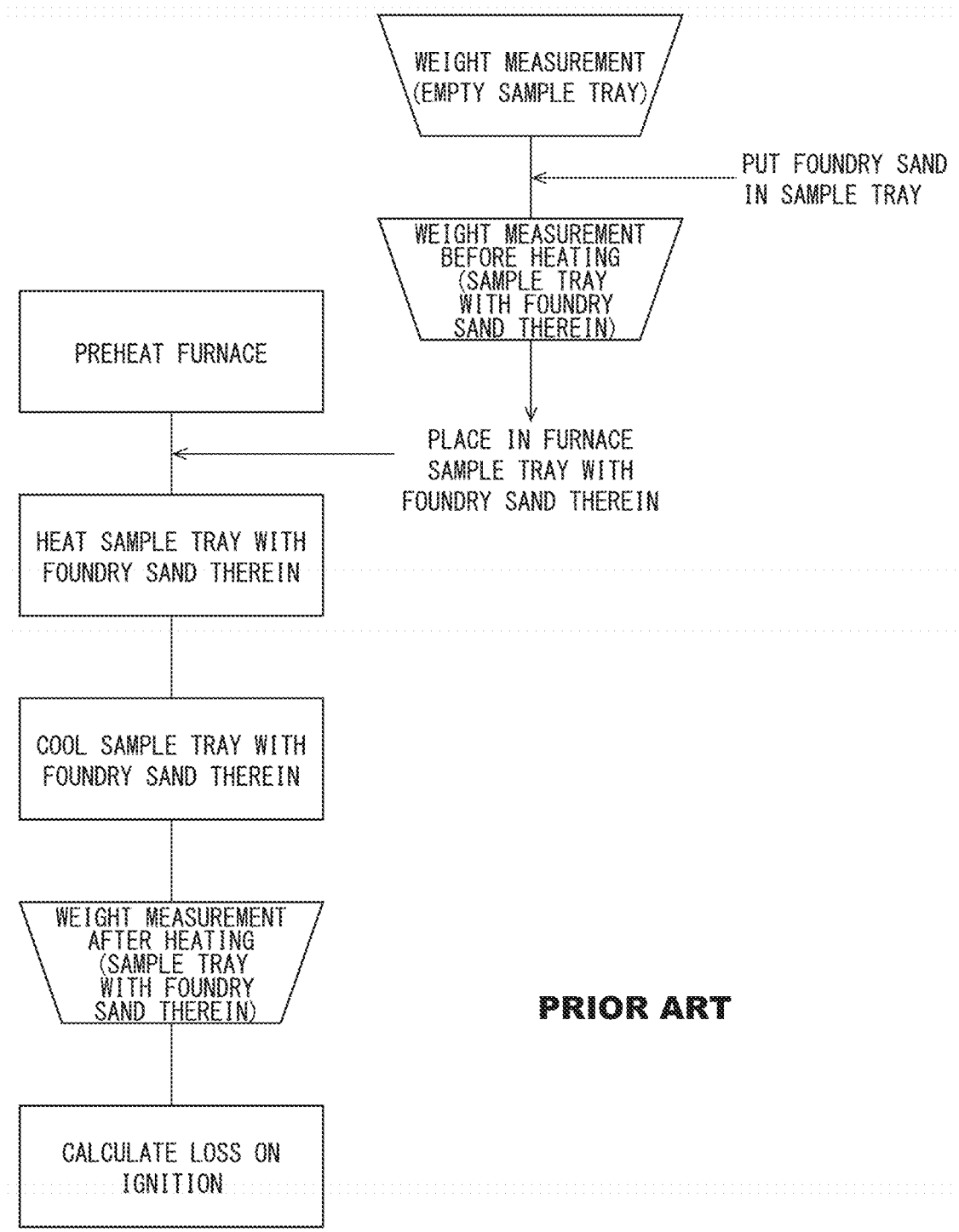

MEASURING DEVICE

This Nonprovisional application claims priority under 35 U.S.C. § 119 on Patent Application No. 2021-109540 filed in Japan on Jun. 30, 2021, the entire contents of which are hereby incorporated by reference.

TECHNICAL FIELD

The present disclosure relates to a measuring device.

BACKGROUND ART

Various techniques are known for thermal analyses, and a number of furnaces and measuring devices for use in thermal analyses have been developed. Japanese Patent Application Publication Tokukai No. 2004-85224 discloses a thermal analysis device including a heat treatment furnace.

Some thermal analyses include the step of cooling a measurement target object after heating. For example, as a type of parameter used in a thermal analysis, a parameter referred to as a loss on ignition (LOI) is widely known. A loss on ignition is a value indicating a ratio between the mass of a sample before heating and the mass of the sample after the heating. More specifically, a loss on ignition is calculated on the basis of, for example, the following equation:

Loss on ignition (%)=[{(weight of sample before heating)−(weight of sample after heating)}/ (weight of sample before heating)]×100

Loss on ignition is performed, for example, to specify the proportion or the amount of an impurity contained in foundry sand or cement or to specify the proportion or the amount of an organic substance contained in soil.

For example, it is possible to specify the amount of a resin remaining in foundry sand which has been used in casting, from a value of a loss on ignition of the foundry sand. In a case where a loss on ignition of foundry sand is calculated, the foundry sand is dried and then heated at 1000° C. for 60 minutes, for example.

An equation for calculating the loss on ignition of the foundry sand is expressed by {(W0−W60)/W0}×100, where W0 is the weight of the foundry sand after drying and before heating, and W60 is the weight of the foundry sand after the heating.

FIG. 10 is a drawing illustrating a procedure for calculating a loss on ignition of foundry sand by a conventional weight measuring method. In preparation for this measurement, a measurer dries foundry sand. Further, at a given timing before a heat treatment (described later), the measurer preheats a furnace to a given temperature (e.g., 1000° C.).

First, the measurer measures the weight of a sample tray which is empty. This sample tray is a tray for putting therein the foundry sand. Next, the measurer puts the foundry sand in the sample tray, and carries out pre-heating weight measurement. As a result, it is possible to measure the "weight of the sample tray with the foundry sand therein before heating". Subsequently, the measurer places, in the furnace which has been preheated, the sample tray with the foundry sand therein, and heats the sample tray with the foundry sand therein for a given time (e.g., 60 minutes).

When the heating ends, the measurer cools, with use of a desiccator, the sample tray with the foundry sand therein so that the sample tray with the foundry sand therein is cooled to substantially ordinary temperature. After the sample tray with the foundry sand therein can be cooled to substantially ordinary temperature, the measurer carries out post-heating weight measurement. As a result, it is possible to measure the "weight of the sample tray with the foundry sand therein after the heating". After the weight of the sample tray with the foundry sand therein can be measured before and after the heating, the measurer calculates a loss on ignition from the weight before and after the heating.

SUMMARY OF INVENTION

Technical Problem

In order to calculate a loss on ignition, it is necessary to measure the weight of a sample before and after heating. As illustrated in FIG. 10, in order to measure the weight of the sample after the heating, it is necessary to have a time to cool, to substantially the same temperature (e.g., room temperature) as before the heating, the sample after the heating. Further, although a sample tray such as a ceramic withstands high temperature in a furnace, the sample tray may break when rapidly cooled. As such, in the conventional weight measuring method, it takes a time to cool the sample (and the sample tray). In addition, such a cooling time is a rate limiting factor, and results in a problem that it is impossible to reduce a time required for weight measurement.

An aspect of the present disclosure has been made in view of the above problems, and the object thereof is to reduce a time required for weight measurement.

Solution to Problem

A measuring device in accordance with an aspect of the present disclosure is a measuring device which heats a measurement target object and which measures a weight of the measurement target object before heating and measures the weight of the measurement target object after the heating. The measuring device includes: a support which supports the measurement target object; a furnace which heats the measurement target object; a moving mechanism which moves the furnace; and a measuring section which measures the weight of the measurement target object. The moving mechanism moves the furnace so that the measurement target object which is supported by the support is housed in the furnace.

Advantageous Effects of Invention

According to an aspect of the present disclosure, it is possible to reduce a time required for weight measurement.

BRIEF DESCRIPTION OF DRAWINGS

FIG. 10 is a drawing illustrating a procedure for calculating a loss on ignition of foundry sand by a conventional weight measuring method.

DESCRIPTION OF EMBODIMENTS

A measuring device in accordance an embodiment of the present disclosure is a measuring device having the functions of heating a measurement target object and measuring the weight of the measurement target object. A measuring device in accordance with an embodiment of the present disclosure can be used, for example, to measure the weight of a measurement target object before and after heating.

A measuring device in accordance with an embodiment of the present disclosure may have the function of calculating various parameters from the measured weight of a measurement target object. The "various parameters" indicate, for example, a loss on ignition, moisture, or a water content. The following description will discuss a measuring device in accordance with an embodiment of the present disclosure in detail, with reference to FIGS. 1 to 9.

Embodiment 1

A measuring device in accordance with Embodiment 1 is a device which measures the weight of a sample (or the sample+a sample tray) before and after heating and calculates a loss on ignition of the sample from the weight. Note here that the term "sample" indicates, for example, foundry sand, cement, soil, textile goods, and the like.

In Embodiment 1, an example in which the sample is foundry sand will be described. Note, however, that the measuring device in accordance with Embodiment 1 is not limited to a case where a loss on ignition of foundry sand is measured, and can be also applied to a case where a loss on ignition of an object (such as cement, soil, or textile goods) other than foundry sand is measured.

Foundry sand is a raw material of a mold. Foundry sand is mixed with an additive(s) such as a resin, water glass, and/or a surfactant, and then formed into a mold. Further, foundry sand may be recovered and reused by crushing a used mold and removing an additive(s).

In order to maintain the quality of foundry sand to be used in casting, it is necessary to appropriately set conditions concerning introduction of new sand, mixing, and recovery. A loss on ignition of foundry sand is a parameter which is referred to in order to appropriately set conditions concerning recovery of the foundry sand, out of the above conditions.

Figure 1:
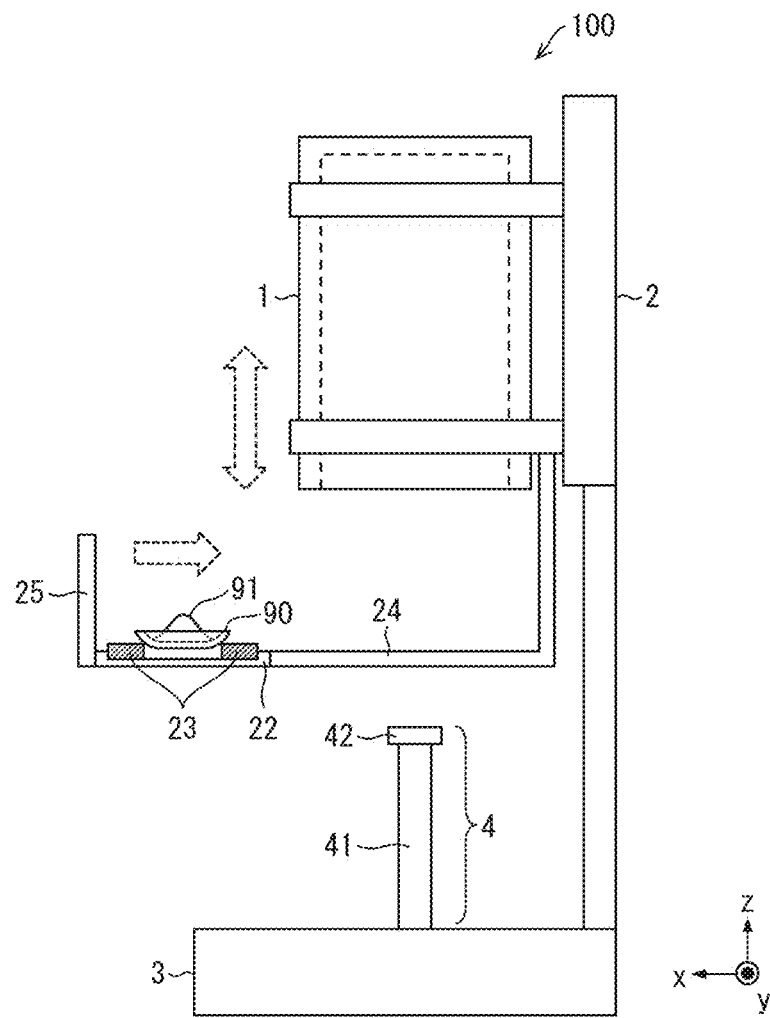
FIG. 1 is a drawing illustrating a configuration of a main part of a measuring device in accordance with Embodiment 1.

FIG. 1 is a drawing illustrating a configuration of a main part of a measuring device 100. The measuring device 100 includes at least a support 4, a furnace 1, an elevating mechanism 2, and an electronic balance 3. Note that, in FIGS. 1 to 6, the direction of an arrow of a z-axis is referred to as "up" and the direction opposite from the direction of the arrow of the z-axis is referred to as "down". Note also that, in FIGS. 1 to 6, the direction of an arrow of an x-axis is referred to as "front" and the direction opposite from the direction of the arrow of the x-axis is referred to as "back". Note also that, in FIGS. 1 to 6, the right direction (i.e., the direction of an arrow of a y-axis) as the measuring device 100 is viewed from the front side toward the back side is referred to as "right" and the left direction (i.e., the direction opposite from the direction of the arrow of the y-axis) is referred to as "left".

FIG. 1 also illustrates, together with the measuring device 100, a sample 91 and a sample tray 90 each of which is a measurement target object of the measuring device 100. The sample tray 90 is not limited to any particular shape, but preferably has a shape such that the sample 91 is exposed as much as possible in the furnace 1 so that thermal conduction with respect to the sample 91 is favorable. For example, the sample tray 90 may be a shallow ceramic tray.

The support 4 is for supporting the measurement target object. The support 4 includes a supporting part 41 and a sample stage 42. The supporting part 41 is a member which supports the sample stage 42. For example, the supporting part 41 may have the shape of a cylinder or a prism. A lower portion of the supporting part 41 is fixed to the electronic balance 3, and the sample stage 42 is fixed to an upper portion of the supporting part 41. Note that the supporting part 41 is not limited to any particular shape or structure. For example, the supporting part 41 may be a frame constituted only by a framework or may be a member filled with a heat insulating material or the like.

The furnace 1 has the functions of preheating a space inside the furnace 1 to a set temperature and heating the space inside the furnace 1 to the set temperature. Note, here, that the term "preheating" means heating the space inside the furnace 1 (inside of a heating part 12 (described later)) to a given temperature (e.g., 1000° C.) in a state where the measurement target object is not put inside the furnace 1. Note also that the term "heating" means (i) putting the measurement target object in the space inside the furnace 1 which has been preheated to the foregoing given temperature and (ii) calcining the measurement target object at the given temperature. In Embodiment 1, the furnace 1 heats the sample 91 and/or the sample tray 90 each of which is the measurement target object. The furnace 1 is physically connected to the elevating mechanism 2.

Note that the furnace 1 is not limited to any particular type, provided that foundry sand can be heated at a temperature and in a time which are required for "weight measurement for calculation of a loss on ignition".

The furnace 1 may have an opening in at least a given direction. For example, the furnace 1 may be disposed such that the opening faces downward. Then, the support 4 may be disposed below the furnace 1.

In a case where the measurement target object is housed in the furnace 1 through the opening of the furnace 1, it is possible to prevent the temperature inside the furnace 1 from dropping due to external air while the measurement target object is being housed in the furnace 1, as compared with, for example, a case where a door of the furnace 1 is opened and then the measurement target object is housed in the furnace 1. That is, by configuring the furnace 1 such that the measurement target object is housed in the furnace 1 through the opening of the furnace 1, it is possible to reduce loss of the temperature inside the furnace 1. Therefore, it is possible to more accurately measure a loss on ignition. Note that the opening preferably has a size and a shape such that the supporting part 41, the sample stage 42, and the measurement target object can pass through the opening. Note that, regardless of whether the furnace 1 has the opening or not, the furnace 1 may have a thermostat function which makes it possible to keep the space inside the furnace 1 at a preset temperature.

The sample stage 42 is a stage for placing thereon the sample 91 and/or the sample tray 90. Note that the sample stage 42 is not limited to any particular shape or size. However, the sample stage 42 preferably has a size and a shape such that the sample stage 42 can be housed inside the furnace 1 through the opening of the furnace 1.

The elevating mechanism 2 is an example of a moving mechanism which moves the furnace 1. The elevating mechanism 2 adjusts the position of the furnace 1 by moving the furnace 1 up and down so that the measurement target object is housed inside the furnace 1. The elevating mechanism 2 is not particularly limited, in terms of mechanical and electrical configurations concerning power and mechanical and electrical configurations concerning driving.

The elevating mechanism 2 raises and lowers the furnace 1 so that the measurement target object can be put in and out of the furnace 1. Therefore, with the configuration illustrated in FIG. 1, it is possible to prevent loss of the temperature inside the furnace 1, and possible to house the measurement target object in the furnace 1 with minimal movement of the furnace 1. Note that, as illustrated in FIG. 1, the elevating mechanism 2 may have a frame for supporting the furnace 1.

The electronic balance 3 is an example of a measuring section which measures the weight of the measurement target object. In Embodiment 1, the electronic balance 3 is taken as an example of the measuring section, but the measuring section can be realized by a balance other than an electronic balance.

The measuring device 100 may include a movable frame 24 which is slidable in the direction (i.e., frontward and backward directions, and rightward and leftward directions) perpendicular to the direction in which the furnace 1 is moved (i.e., upward and downward directions). The measuring device 100 may also include a plate 23 on which the measurement target object is placed and which, as the movable frame 24 slides, moves in the direction perpendicular to the direction in which the furnace 1 is moved.

In an example illustrated in FIG. 1, the movable frame 24 is provided as a part of the elevating mechanism 2. A placement part 22 is attached to the movable frame 24, and a pull-out part 25 is attached to the placement part 22. The plate 23 is removably fitted in the placement part 22.

Note that the placement part 22 and the pull-out part 25 do not necessarily need to move downward as the elevating mechanism 2 moves. In a case where the pull-out part 25 does not move downward, the attachment of the placement part 22 to the movable frame 24 is canceled when the elevating mechanism 2 moves the movable frame 24 downward.

The placement part 22 is a member for holding the plate 23 when the pull-out part 25 is in a state of having been pulled out. A shape of the placement part 22 will be described later in detail. The plate 23 is a structure on which a user places the sample tray 90, and is a structure for holding the sample tray 90 and carrying the sample tray 90 to the sample stage 42. In the example illustrated in FIG. 1, the plate 23 is in the form of a single plate. Furthermore, in the example illustrated in FIG. 1, the plate 23 has a hole which is larger than the sample stage 42 and smaller than the sample tray 90.

The pull-out part 25 is a mechanism which assists the user in placing the sample tray 90 on the plate 23. The pull-out part 25 has a structure such that the user can pull out the pull-out part 25 frontward or push the pull-out part 25 backward. The movable frame 24 is a frame which slides frontward in response to a frontward force acting on the pull-out part 25 and the placement part 22. Further, the movable frame 24 is a frame which slides backward in response to a backward force acting on the pull-out part 25 and the placement part 22.

In addition, the measuring device 100 may include at least any of the following: a control section (control section 10 (described later)) for controlling the measuring device 100 in an integrated manner; a storage section in which various pieces of data necessary for an operation of the control section 10 are stored; an input interface (input I/F) for accepting an instruction from the user; and an output interface (output I/F) for presenting a result of measurement and the like to the user. Note that the input I/F and the output I/F may be integrally configured, as in a touch panel display (touch panel display 6 (described later)). Note also that the control section and the storage section may be each included in the measuring device 100 or may be each an external device which differs from the measuring device 100. In a case where one or both of the control section and the storage section are external devices, the measuring device 100 is electrically connected to the one or both of the control section and the storage section.

Figure 2:
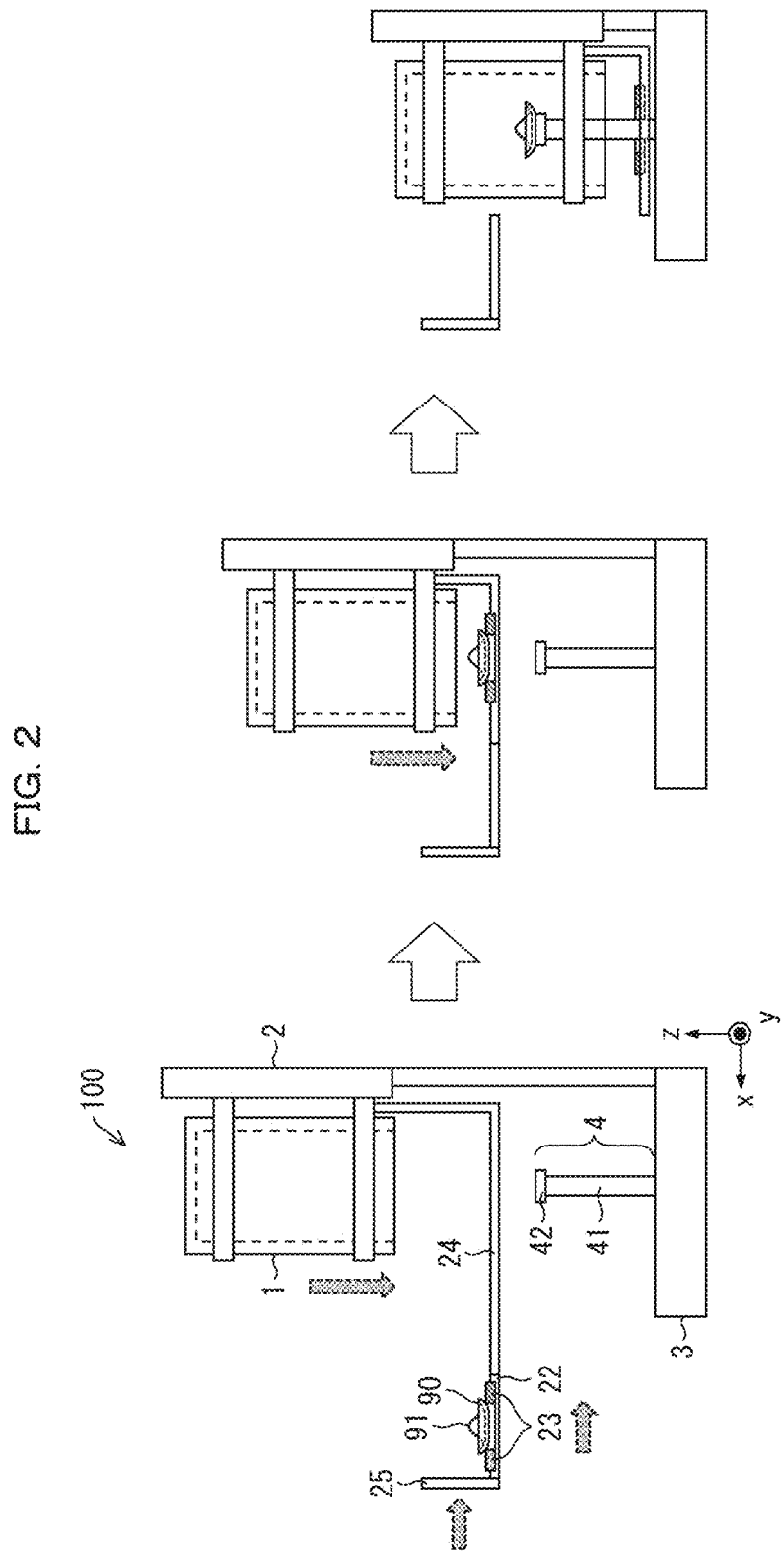
FIG. 2 is a drawing illustrating an outline of operations of the measuring device.
Figure 3:
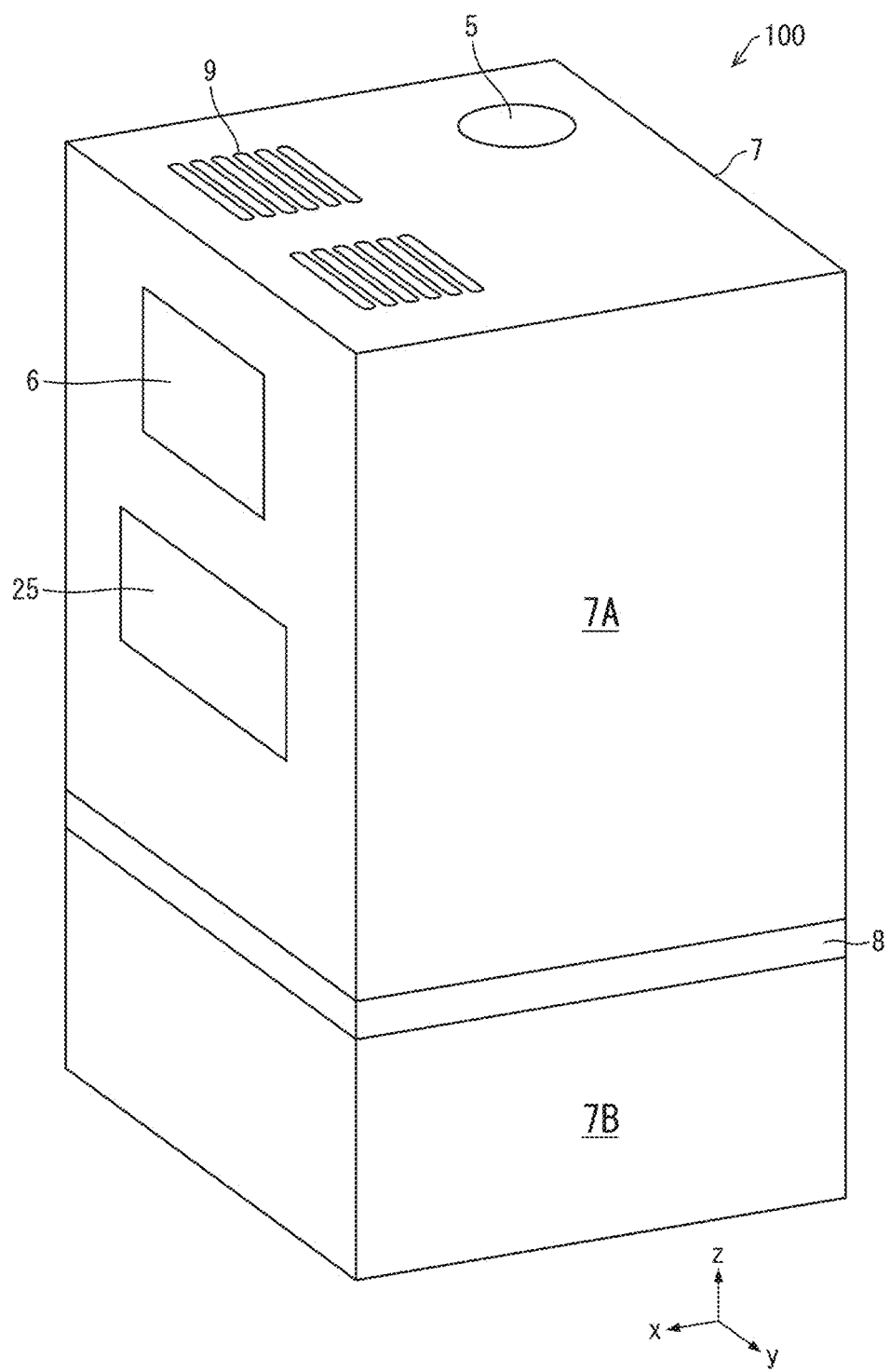
FIG. 3 is a drawing illustrating a specific example of appearance of the measuring device.

FIG. 2 is a drawing illustrating an outline of operations of the measuring device 100. In FIG. 2, order in which the measuring device 100 carries out the operations is indicated by hollow arrows. Note that although, in practice, the measuring device 100 may be covered by a housing (housing 7 (described later)) as illustrated in FIG. 3 (described later), the housing is not illustrated in FIG. 2 because FIG. 2 is for illustrating the operations of the measuring device 100. Movement of each part of the measuring device 100 is indicated by a gray arrow with a dotted line. For the sake of clarity, a numerical sign is appended to each member only in a figure on the left side (the first figure) of FIG. 2. However, the same numerical sign applies to each member of the measuring device 100 also in a figure in the middle (the second figure) and a figure on the right side (the third figure).

In the measuring device 100, the pull-out part 25 is initially in a state of having been pushed backward (i.e., housed in the housing). When the user pulls frontward the pull-out part 25 which is in the state of having been pushed backward, a frontward force acts on the pull-out part 25. This force is transmitted to the movable frame 24 via the placement part 22. Upon receipt of the frontward force, the movable frame 24 slides frontward. When the movable frame 24 slides frontward, the plate 23 is placed on the movable frame 24, and moves frontward as the movable frame 24 slides. When the pull-out part 25 goes into the state of having been pulled out, the plate 23 goes into a state of having been fitted and held in the placement part 22.

The first figure in FIG. 2 illustrates a position and an operation of each part when the user pushes backward the pull-out part 25 which is in the state of having been pulled out frontward. As illustrated in the first figure, when the pull-out part 25 is pushed backward, the plate 23 moves away from the placement part 22. The plate 23 which has moved away from the placement part 22 is placed on the movable frame 24. The movable frame 24 receives a backward force via the placement part 22. Upon receipt of the backward force, the movable frame 24 slides backward. Accordingly, the plate 23 which is placed on the movable frame 24 also moves backward as the movable frame 24 slides. The elevating mechanism 2 starts to lower the furnace 1 in parallel with or after the sliding of the movable frame 24.

The second figure in FIG. 2 illustrates a position and an operation of each part when the pull-out part 25 is in the state of having been pushed backward and the furnace 1 is in the middle of being lowered. As illustrated in the second figure, when the pull-out part 25 goes into the state of having been fully pushed backward, the plate 23 is placed in a position such that a hole of the plate 23 is just above the sample stage 42. The elevating mechanism 2 continues to lower the furnace 1. As a result, the sample tray 90 is housed inside the furnace 1.

The third figure in FIG. 2 illustrates the measuring device 100 when the sample tray 90 is housed in the furnace 1. When the furnace 1 is lowered, the plate 23 moves downward as if the plate 23 was pushed by the furnace 1. Note that, in so doing, the movable frame 24 may also move below the furnace 1 as the furnace 1 is lowered. In this case, the pull-out part 25 and the placement part 22 may be supported by a portion of the housing (not illustrated).

As the furnace 1 is lowered, the sample stage 42 enters the furnace 1. In so doing, the sample stage 42 passes through the hole of the plate 23, and enters the furnace 1 while pushing up the sample tray 90 which has been placed in the hole. This causes the sample tray 90 to be transferred from the plate 23 to the sample stage 42 and housed inside the furnace 1 together with the sample stage 42 (and at least a portion of the supporting part 41).

According to the above operations, it is possible for the user to move the plate 23 frontward, which is a place where the sample tray 90 is set, by simply pulling the pull-out part 25 frontward. Thus, it is possible for the user to more easily and more accurately set the sample tray 90.

Furthermore, according to the above operations, it is possible for the user to move the plate 23, on which the sample tray 90 is placed, backward, i.e., toward the side on which the furnace 1 is located, by simply pushing backward the pull-out part 25 in which the sample tray 90 is set. Thus, it is possible for the user to set the sample tray 90 on the sample stage 42 with a simple operation. In addition, it is possible for the user to place the sample tray 90 on the sample stage 42 even in a case where the sample stage 42 is at a position where it is difficult to directly set the sample tray 90.

Note that the movable frame 24 may be configured to be collapsible or separable upward and downward, in addition to being configured to slide frontward and backward. For example, when the pull-out part 25 is in the state of having been pushed backward, the movable frame 24 may be in a state of having been folded or separated upward and downward into two components. Then, when the pull-out part 25 is pulled out frontward, the folded movable frame 24 may be extended or the separated components may be reconnected so as to be a single frame. Then, when the movable frame 24 becomes a single frame, movement of sliding frontward may occur in at least a portion of the movable frame 24, and the plate 23 may move, together with the pull-out part 25, from below the furnace 1 along with such movement.

FIGS. 3 to 6 are drawings illustrating specific examples of appearance and an internal structure of the measuring device 100, the configuration of the main part and the operations of which have been described with reference to FIGS. 1 and 2. Note that the measuring device 100 illustrated in FIGS. 3 to 6 indicates the measuring device 100 when the furnace 1 is lowered to the lowest position. Further, the measuring device 100 illustrated in FIGS. 3 to 6 indicates the measuring device 100 in a state where the pull-out part 25 has been housed in the housing 7. Further, it is assumed that the movable frame 24 of the measuring device 100 illustrated in FIGS. 3 to 6 are separated upward and downward when the pull-out part 25 is in a state of having been housed in the housing 7.

As illustrated in FIG. 3, the measuring device 100 may include the housing 7 which covers the support 4, the furnace 1, the elevating mechanism 2, and the electronic balance 3. The housing 7 is not limited to any particular size, shape, or material. However, the size, the shape, and the material of the housing 7 (in particular, a portion thereof which is close to the furnace 1) are preferably those such that the housing 7 is not deformed or altered by waste heat of the furnace 1. Further, the touch panel display 6 may be provided on a surface of the housing 7. A handle or the like for pulling out the pull-out part 25 (described later) may be provided on a surface of the housing 7.

The measuring device 100 may have a partition plate 8 which partitions an internal space of the housing 7 into (i) a first space 7A in which the furnace 1 and the elevating mechanism 2 are disposed and (ii) a second space 7B in which the electronic balance 3 is disposed. Note that, in this case, the support 4 is provided so as to pass through both the first space 7A and the second space 7B. That is, the support 4 is provided so as to lie across both the first space 7A and the second space 7B. By separating the first space 7A and the second space 7B with use of the partition plate 8, it is possible to protect the electronic balance 3 from heat generated by the furnace 1. Therefore, it is possible to prevent a failure of the electronic balance 3 due to heat of the furnace 1. Note that the partition plate 8 is not limited to any particular thickness or material, but the partition plate 8 preferably has heat insulating properties in view of application of the partition plate 8. Note that the partition plate 8 and the housing 7 may be integrally formed as illustrated in FIG. 3. Note also that the partition plate 8 may be provided so as to protrude from the housing 7. Note also that the partition plate 8 may be provided so as to extend along an inner wall of the housing 7.

Note that a fan 5 for discharging air inside the housing 7 may be provided to a portion of the housing 7 which portion is located on the first space 7A side. Note also that an inlet 9 for taking air into the housing 7 from outside the housing 7 may be provided to a portion of the housing 7 which portion is located on the first space 7A side. In this manner, by providing the fan 5 and the inlet 9 to the housing 7, it is possible to take in external air through the inlet 9 and discharge air through the fan 5. Therefore, it is possible to efficiently discharge heat generated by the furnace 1.

Note that the fan 5 is not limited to any particular size, shape, type, or position in the first space 7A. Note also that the inlet 9 is not limited to any particular size, shape, type, or position in the first space 7A.

Figure 4:
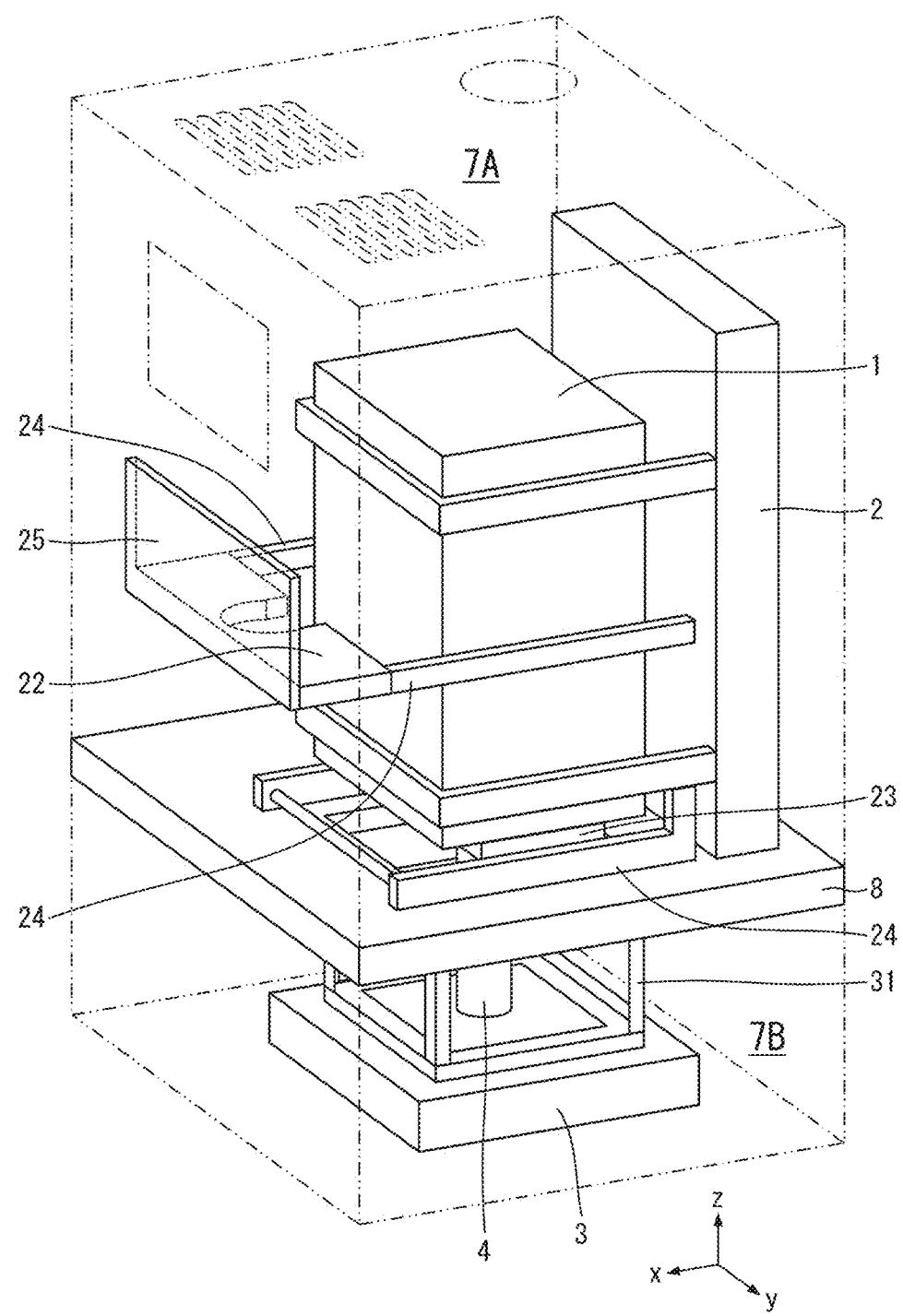
FIG. 4 is a drawing illustrating a specific example of an internal structure of the measuring device.

FIG. 4 is a perspective diagram illustrating, in a perspective manner, the housing 7 of the measuring device 100 illustrated in FIG. 3. In the measuring device 100, a frame 31 may be disposed or fixed to an upper portion of the electronic balance 3. The support 4 may be supported by the frame 31.

The measuring device 100 may include also a light blocking plate which blocks light and/or heat emitted from the furnace 1. The light blocking plate is provided, for example, at a position at which, when the furnace 1 illustrated in FIG. 4 is lowered to the lowest position, the light blocking plate is sandwiched between the furnace 1 and the partition plate 8. This makes it possible to prevent light and/or heat which has leaked from the furnace 1 from propagating to the electronic balance 3. Therefore, it is possible to prevent a failure of the electronic balance 3.

The light blocking plate is not limited to any particular size and shape, provided that light and/or heat from the furnace 1 can be prevented from leaking to the second space 7B through the partition plate 8 (in particular, through a hole portion of the partition plate 8 through which the support 4 passes). For example, light and/or heat from the furnace 1 may be blocked by disposing, in the hole portion, a member having a light blocking function and/or a heat insulating function, instead of the light blocking plate. Note that the light blocking plate is preferably made of a heat-resistant material and/or a heat insulating material. For example, the side of the light blocking plate which faces the furnace may be made of ceramic which is a heat-resistant material, and the side of the light blocking plate which faces the partition plate 8 is made of glass wool which is a heat insulating material.

The light blocking plate may be provided between the partition plate 8 and the frame 31. Alternatively, in a case where the frame 31 is hollow as illustrated in FIG. 4, light and/or heat leaking to the second space 7B through the hole portion may be blocked by disposing, instead of the light blocking plate, a light blocking member inside the frame 31.

In an example illustrated in FIG. 4, the placement part 22 is connected to the pull-out part 25. The placement part 22 is a member for holding the plate 23 which has moved frontward. The placement part 22 has a cavity which is open backward. The placement part 22 has a hole which is smaller than the sample tray 90, and a cut which is directed backward and through which the sample tray 90 can pass backward.

As in the example illustrated in FIG. 4, in a case where the measuring device 100 includes the placement part 22, the plate 23 fits into a cavity portion of the placement part 22 when the pull-out part 25 goes into the state of having been pulled out. Then, the user can set the sample tray 90 on the plate 23 from above the hole (or the cut) of the placement part 22. This allows the user to set the sample tray 90, while suppressing a wobble of the plate 23. Thus, it is possible for the user to more safely set the sample tray 90.

Figure 5:
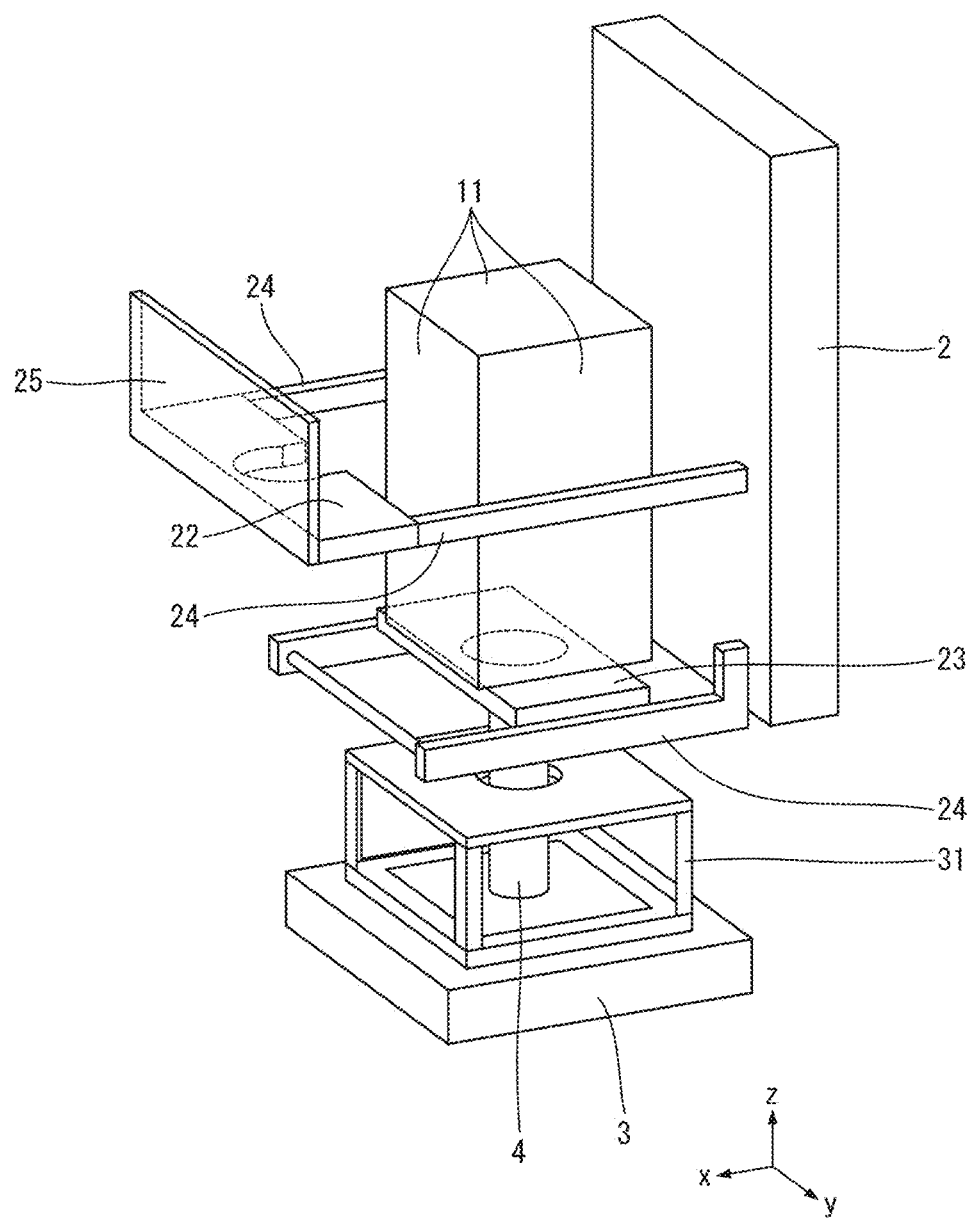
FIG. 5 is a drawing illustrating a specific example of the internal structure of the measuring device.

FIG. 5 is a perspective diagram illustrating, in a perspective manner, the housing 7, a heat insulating member of the furnace 1, and a frame which supports the heat insulating member, of the measuring device 100 illustrated in FIG. 4. An inner wall 11 is provided on the inner side of the heat insulating member of the furnace 1. The inner wall 11 supports a central part of the furnace 1, i.e., a heating part of the furnace 1 (heating part 12 (described later)), and is for blocking waste heat of the heating part 12.

Figure 6:
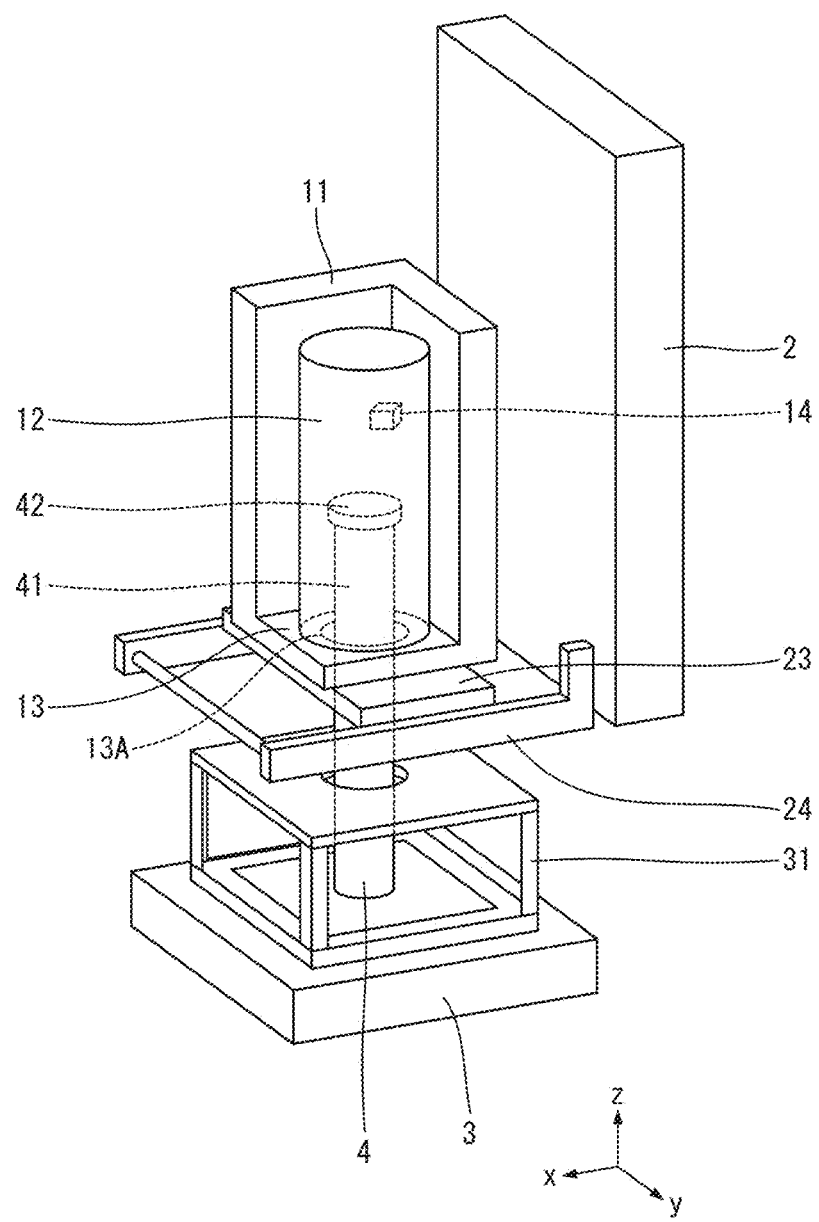
FIG. 6 is a drawing illustrating a specific example of the internal structure of the measuring device.

FIG. 6 is a perspective diagram illustrating, in a partially perspective manner, the inner wall 11 of the furnace 1 of the measuring device 100 illustrated in FIG. 5. The heating part 12 of the furnace 1 is provided on the inner side of the inner wall 11 of the furnace 1. In an example illustrated in FIG. 5, the heating part 12 is hollow and has a cylindrical shape, but the heating part 12 is not limited to any particular shape. Note that the heating part 12 may be formed in a small size, provided that the heating part 12 can heat the sample tray 90. Reduction in size of the heating part 12 makes it possible to reduce a time it takes for the heating part 12 to reach the set temperature. A furnace bottom surface 13 is provided under the heating part 12. The furnace bottom surface 13 has an opening 13A though which the supporting part 41, the sample stage 42, and the measurement target object are housed in the furnace 1.

FIG. 6 also illustrates an internal structure of the heating part 12. At least a portion of the supporting part 41 and the sample stage 42 are housed in the furnace 1 together with the measurement target object. A temperature sensor 14 is provided inside the heating part 12. The temperature sensor 14 is a sensor for measuring the temperature of the heating part 12. In a case where the measuring device 100 includes the temperature sensor 14, the temperature sensor 14 is connected to the control section 10, and transmits, to the control section 10, information based on a result of measurement.

The measuring device 100 may include at least any of various switches, buttons, lamps, and timers, in addition to the structures described with reference to FIGS. 3 to 6. Examples of the switches include a key switch for switching between on and off of a power source of the measuring device 100. Examples of the buttons include: a power button for turning on the power source of the measuring device 100; and a furnace power button for causing the furnace 1 to start heating.

The lamps are each an output device for indicating a state of the furnace 1, the elevating mechanism 2, or the electronic balance 3 to the user of the measuring device 100. For example, the measuring device 100 may include a home position lamp which indicates that the furnace 1 has been located in its home position. The measuring device 100 may also include a measurement capable lamp which indicates that weight measurement has become capable of being carried out in the measuring device 100.

A timer is a device which measures a time in the measuring device 100. For example, the measuring device 100 may include a timer which measures a heating time of the furnace 1.

The measuring device 100 may also include a sensor which detects the pull-out part 25 having been pulled out and housed (hereinafter referred to as a pull-out sensor). A position at which the pull-out sensor is disposed is not limited to any particular one. For example, the pull-out sensor may be provided to the movable frame 24, the placement part 22, the pull-out part 25, or the housing 7. In a case where the measuring device 100 includes the pull-out sensor, the pull-out sensor is connected to the control section 10, and transmits, to the control section 10, information based on a result of detection.

The measuring device 100 may also include a temperature sensor which is provided on, out of outer walls of the furnace 1 illustrated in FIG. 4, the outer wall which is located on the side on which the elevating mechanism 2 is disposed (hereinafter referred to as a wall surface temperature sensor). The wall surface temperature sensor is a sensor which measures the temperature of the outer wall of the furnace 1. As with the case of the other sensors, the wall surface temperature sensor is also connected to the control section 10, and transmits, to the control section 10, information based on a result of measurement.

Figure 7:
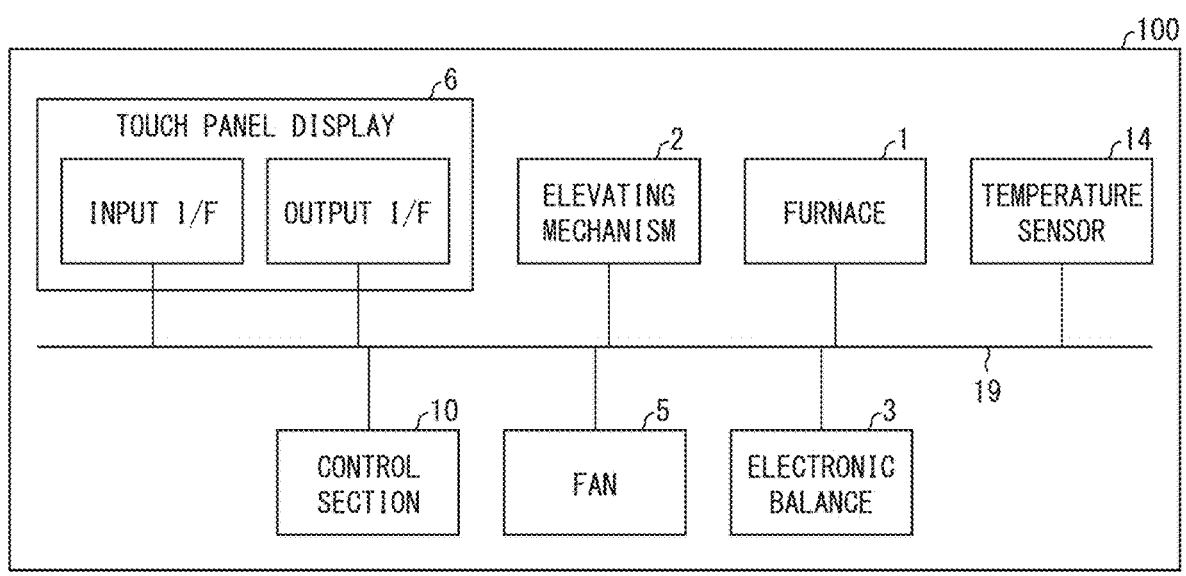
FIG. 7 is a block diagram illustrating an outline of a software configuration of the measuring device.

FIG. 7 is a block diagram illustrating an outline of a software configuration of the measuring device 100. The furnace 1, the elevating mechanism 2, the electronic balance 3, the fan 5, the touch panel display 6, and the temperature sensor 14 of the measuring device 100 are each electrically connected to the control section 10 via a bus 19.

Note that the measuring device 100 may additionally include the storage section. In a case where the measuring device 100 includes the storage section, the storage section is also electrically connected to the control section 10 via the bus 19. The measuring device 100 may be connected, by wire or wireless, to an external device such as a data logger. In this case, the control section 10 of the measuring device 100 may transmit, to the external device, (i) a result of measurement carried out by the electronic balance 3 and (ii)

a value of a loss on ignition calculated by the control section 10. Further, in a case where the measuring device 100 includes the pull-out sensor and/or the wall surface temperature sensor, the control section 10 may be connected to these sensors by wire or wireless.

The control section 10 controls the measuring device 100 in an integrated manner. The control section 10 accepts, via the input I/F of the touch panel display 6, an instruction operation carried out by the user with respect to the measuring device 100. The control section 10 controls each of the furnace 1, the elevating mechanism 2, the electronic balance 3, the fan 5, and the touch panel display 6 in accordance with the instruction operation which the control section 10 has accepted.

For example, the control section 10 sets a heating temperature and a heating time of the furnace 1, and controls the furnace 1 to carry out heating. Further, the control section 10 controls, for example, driving of the elevating mechanism 2. More specifically, the control section 10 controls timings at which the elevating mechanism 2 raises and lowers the furnace 1, raising and lowering distances, and raising and lowering speeds.

The control section 10 also controls, for example, on and off of the electronic balance 3. The control section 10 also obtains a result of measurement from the electronic balance 3. Note that the control section 10 may store the result of the measurement in the storage section. Further, the control section 10 may control, for example, on and off of the fan 5 and a rotational speed of the fan 5. Further, the control section 10 may control, for example, screen display on the touch panel display 6.

The control section 10 may also control an operation of each part of the measuring device 100 on the basis of information obtained from various sensors. For example, the control section 10 may control, on the basis of the temperature measured by the temperature sensor 14, output of the furnace 1 so that the heating part 12 of the furnace 1 reaches the preset temperature.

The control section 10 may also detect, from information based on a result of detection made by the pull-out sensor, the pull-out part 25 having been pulled out from the housing 7 or housed in the housing 7. Then, the control section 10 may control the elevating mechanism 2 to operate, in response to the fact that the pull-out part 25 has been housed in the housing 7, which is a trigger.

The control section 10 may also control the output of the furnace 1 on the basis of a temperature measured by the wall surface temperature sensor. For example, in a case where the temperature measured by the wall surface temperature sensor is equal to or higher than a given value, the output of the furnace 1 may be stopped for protection of the measuring device 100. Note that in a case where the output of the furnace 1 is stopped in this manner, the control section 10 may control the touch panel display 6 and/or the like to notify the user of an error.

Note that in a case where the measuring device 100 includes various switches and/or buttons, the control section 10 may detect the various switches and/or buttons having been turned on and off. Then, the control section 10 may control each part of the measuring device 100, in response to the fact that a corresponding one of the various switches and/or buttons has been turned on or off. In a case where the measuring device 100 includes various lamps, the control section 10 may control the various lamps to be turned on and off. In a case where the measuring device 100 includes various timers, the control section 10 may control the various timers to start, stop, and reset measurement. Alternatively, the control section 10 itself may function as a software timer.

Figure 8:
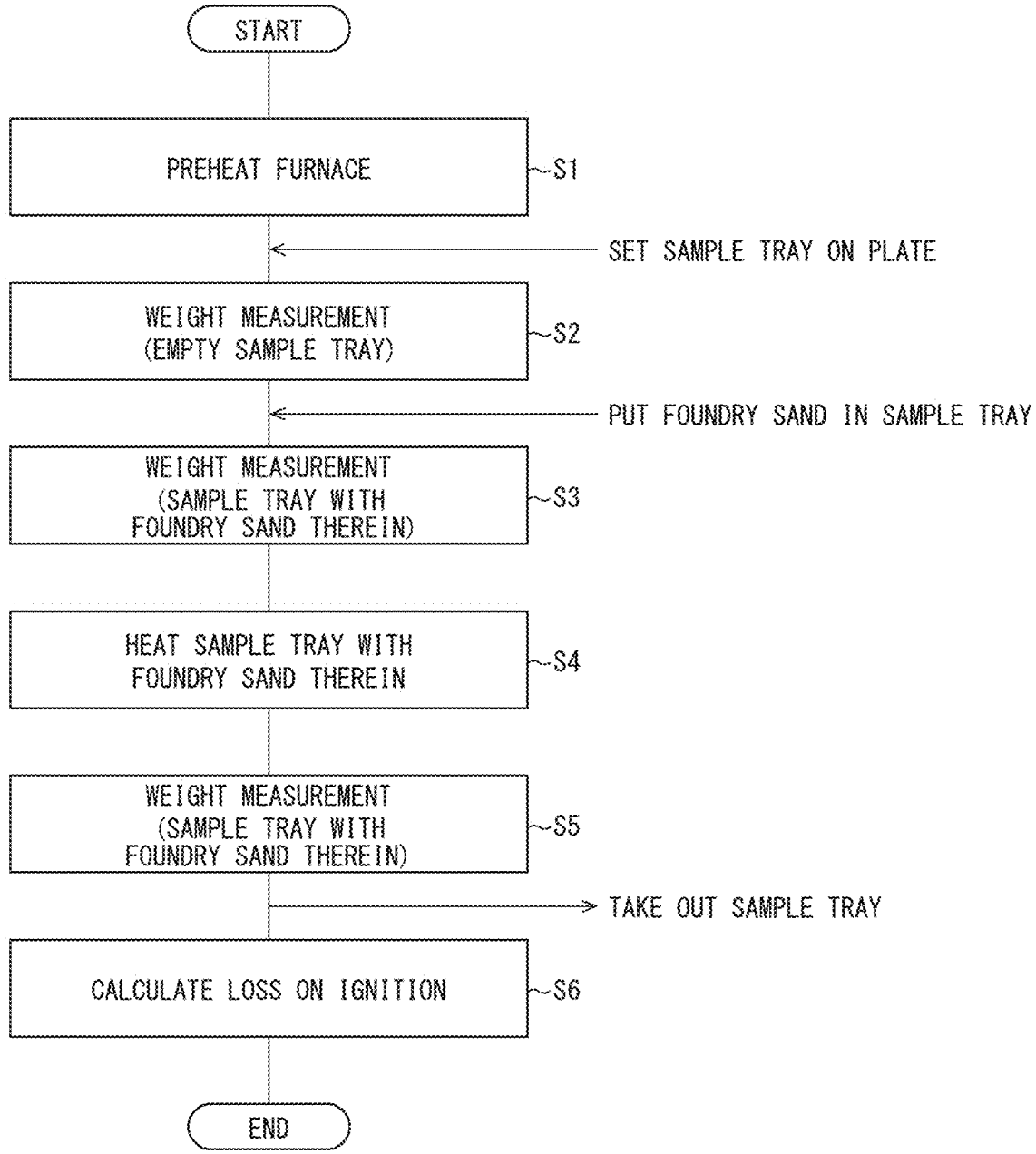
FIG. 8 is a flowchart illustrating an example of a flow of the operations of the measuring device.

FIG. 8 is a flowchart illustrating an example of a flow of operations of the measuring device 100. A trigger for starting the series of operations illustrated in FIG. 8 is not limited to any particular one. For example, the series of operations illustrated in FIG. 8 may be started when the power source of the measuring device 100 is switched on.

First, the control section 10 of the measuring device 100 controls the furnace 1 to preheat the space inside the furnace 1 at a preset temperature (S1). For example, in a case where weight measurement is carried out so as to calculate a loss on ignition of foundry sand, the furnace 1 preheats the space inside the furnace 1 at approximately 1000° C. Note that the control section 10 may detect the preheating having ended, on the basis of, for example, a temperature measured by the temperature sensor 14. Then, when the preheating ends, the control section 10 may control the touch panel display 6 and/or the like to notify the user of completion of the preheating.

The user places the sample tray 90 in the measuring device 100 in which the preheating by the furnace 1 has been completed. Specifically, the user pulls out the pull-out part 25, and sets the sample tray 90 on the plate 23 through the hole of the placement part 22. The user then houses the pull-out part 25 in the housing 7 again.

When the pull-out part 25 is housed in the housing 7 after having been pulled out, the movable frame 24 slides backward. As the movable frame 24 slides backward, the plate 23 also moves backward and moves to a position above the sample stage 42. The elevating mechanism 2 lowers the furnace 1. In so doing, the sample stage 42 (and the supporting part 41) passes through the hole of the plate 23 and pushes up the sample tray 90. As a result, the sample tray 90 and the sample stage 42 (and at least a portion of the supporting part 41) are housed in the furnace 1. Meanwhile, the plate 23 moves downward as the furnace 1 is lowered. Thereafter, inside the furnace 1, the sample tray 90 is heated to approximately the same temperature as the temperature inside the furnace 1.

In a case where a given time has elapsed since the sample tray 90 was housed in the furnace 1 or in a case where the temperature measured by the temperature sensor 14 has risen to a given temperature after the sample tray 90 was housed in the furnace 1, the control section 10 determines that the sample tray 90 has been heated to approximately the same temperature as the temperature inside the furnace 1. In a case where the control section 10 made such a determination, the control section 10 controls the electronic balance 3 to measure the weight of the sample tray 90 (S2). The weight measured here is the weight of the sample tray 90 which is empty. The control section 10 obtains a value of the weight thus measured.

When the weight measurement ends, the elevating mechanism 2 raises the furnace 1 so that the sample tray 90 is outside the furnace 1. In so doing, as the furnace 1 is raised, the plate 23 (and a portion of the movable frame 24) moves upward. The sample tray 90 which is empty is lifted from the sample stage 42 and placed on the plate 23 in such a manner that the sample tray 90 is fitted into the hole of the plate 23. Note that, at the end of the weight measurement or when the sample tray 90 is lifted from the sample stage 42 (i.e., when the sample tray 90 is removed from the sample stage 42), the control section 10 may carry out control so that the user is notified of completion of the measurement.

When, in this state, the pull-out part 25 is pulled out by the user, the movable frame 24 slides frontward. This causes the plate 23 to move together with the pull-out part 25 while the sample tray 90 is placed on the plate 23. The user puts the sample 91 (i.e., foundry sand) in the sample tray 90 placed on the plate 23. After putting the foundry sand, the user pushes the pull-out part 25 so that the pull-out part 25 is housed in the housing 7 as has been before. This causes the plate 23 to move backward again to the position above the sample stage 42. The elevating mechanism 2 then lowers the furnace 1. This causes the sample stage 42 to pass through the hole of the plate 23 and pushes up the sample tray 90. As a result, the sample tray 90 and the sample stage 42 (and at least the portion of the supporting part 41) are housed inside the furnace 1 again. Thereafter, inside the furnace 1, the sample tray 90 with the foundry sand therein is heated to approximately the same temperature as the temperature inside the furnace 1.

In a case where a given time has elapsed since the sample tray 90 with the foundry sand therein was housed in the furnace 1, the control section 10 determines that the foundry sand and the sample tray 90 have been heated to approximately the same temperature as the temperature inside the furnace 1. Alternatively, in a case where the temperature measured by the temperature sensor 14 has risen to a given temperature after the sample tray 90 with the foundry sand therein was housed in the furnace 1, the control section 10 determines that the foundry sand and the sample tray 90 have been heated to approximately the same temperature as the temperature inside the furnace 1. In a case where the control section 10 made such a determination, the control section 10 controls the electronic balance 3 to measure the weight of the sample tray 90 with the foundry sand therein (S3, measurement controlling step). The weight measured here is the weight of the sample tray 90+the foundry sand at a time when the foundry sand and the sample tray 90 reached the temperature inside the heating part 12. That is, the weight measured here is the weight of the foundry sand+the sample tray 90 before the foundry sand is heated. Hereafter, the weight measurement in S3 is also referred to as "pre-heating weight measurement". The control section obtains a value of the weight thus measured (first measurement result obtaining step).

When the pre-heating weight measurement ends, the control section 10 carries out control so that the sample tray 90 with the foundry sand therein is heated for a given time, while controlling the temperature of the heating part 12 of the furnace 1 to be a constant temperature (S4). When the heating ends, the control section 10 determines that the heating of the sample tray 90 with the foundry sand therein has been completed. In a case where the control section 10 made such a determination, the control section 10 controls the electronic balance 3 to measure the weight of the sample tray 90 with the foundry sand therein (S5, measurement controlling step). The weight measured here is the weight of the foundry sand+the sample tray 90 after the foundry sand is heated. Hereafter, the weight measurement in S5 is also referred to as "post-heating weight measurement". The control section 10 obtains a value of the weight thus measured (second measurement result obtaining step).

When the weight measurement ends, the control section 10 calculates a loss on ignition (%) (S6, calculating step). The loss on ignition can be calculated, for example, by the following Equation 1.

$$\text{Loss on ignition (\%)} = [\{(\text{weight measured in } S3) - (\text{weight measured in } S5)\} / \{(\text{weight measured in } S3) - (\text{weight measured in } S2)\}] \times 100 \quad [\text{Equation 1}]$$

When the calculation of the loss on ignition ends, the control section 10 control the touch panel display 6 to display this calculated loss on ignition. The control section 10 may also store the calculated loss on ignition in the storage section. The control section 10 may also transmit the calculated loss on ignition to the external device, such as a PLC, a personal computer, and a data logger.

When the calculation of the loss on ignition ends, the elevating mechanism 2 raises the furnace 1. As the furnace 1 is raised, the plate 23 (and a portion of the movable frame 24) moves upward. The sample tray 90 with the foundry sand therein is lifted from the sample stage 42 and placed on the plate 23 in such a manner that the sample tray 90 is fitted into the hole of the plate 23. When, in this state, the pull-out part 25 is pulled out by the user, the movable frame 24 slides frontward. This causes the plate 23 to move together with the pull-out part 25 while the sample tray 90 is placed on the plate 23. The user can take out the sample tray 90 with the foundry sand therein which is placed on the plate 23.

According to the above process, it is possible to measure the weight of a sample tray with foundry sand therein before and after heating, in a state where the sample tray is housed in the furnace 1. This makes it possible to omit a step of cooling the foundry sand and the sample tray after the heating. Therefore, it is possible to reduce a time required for weight measurement. Moreover, it is also possible to reduce a time required for calculation of a loss on ignition.

Furthermore, according to the above process, a measurement target object is housed in the furnace 1 together with at least a portion of the support 4. This allows the support 4 to support the measurement target object also in the furnace 1. Therefore, since the position of the measurement target object in the furnace 1 can be stabilized, it is possible to more accurately measure a loss on ignition.

Note that a parameter calculated in S6 is not limited to a loss on ignition. In S6, the measuring device 100 may calculate at least a loss of the weight of foundry sand due to heating or a parameter which can be calculated on the basis of the loss.

Embodiment 2

A measuring device in accordance with an embodiment of the present disclosure may correct, depending on a zero point, at least one of a weight before heating and the weight after the heating, before calculating a loss on ignition (correcting step). This makes it possible for the measuring device 100 to more accurately calculate the loss on ignition.

Figure 9:
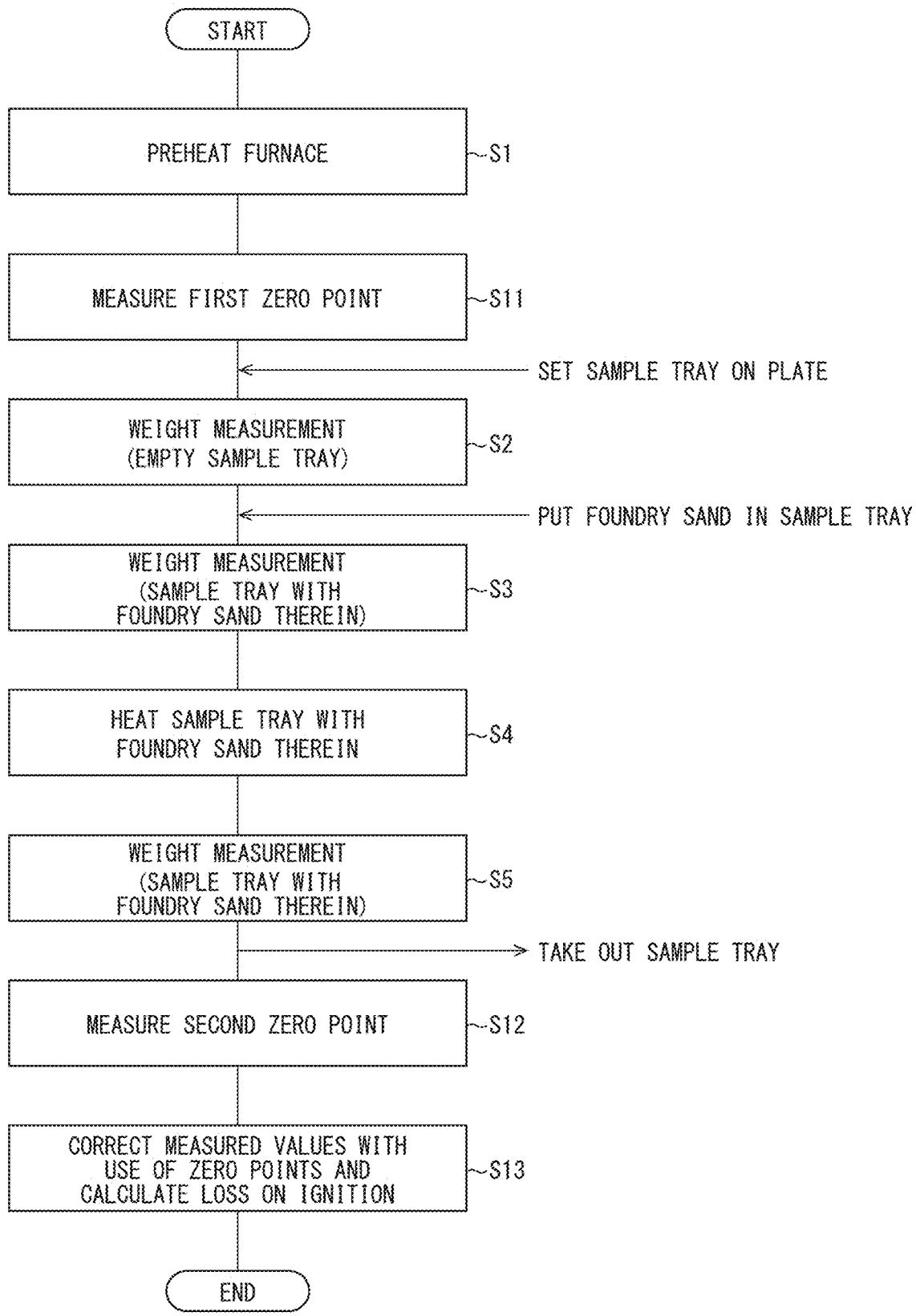
FIG. 9 is a flowchart illustrating an example of a flow of operations of a measuring device in accordance with Embodiment 2.

The following description will discuss Embodiment 2 of the present disclosure with reference to FIG. 9. For convenience, members having the same functions as those of the members described in Embodiment 1 are denoted by the same reference numerals, and the description thereof will not be repeated. Furthermore, processes which are the same as those described in Embodiment 1 are denoted by the same step numerals, and the description thereof will not be repeated.

FIG. 9 is a flowchart illustrating an example of a flow of operations of a measuring device 100 in accordance with Embodiment 2. The measuring device 100 in accordance with Embodiment 2 differs from the measuring device 100 in accordance with Embodiment 1 in that the former carries out operations in S11 and S12. Further, the measuring device 100 in accordance with Embodiment 2 differs from the measuring device 100 in accordance with Embodiment 1 in that the former carries out an operation in S13, instead of the operation in S6 illustrated in FIG. 8. Moreover, in a case where a user uses the measuring device 100 in accordance with Embodiment 2, the user takes out, between S5 and S12, a sample tray 90 with foundry sand therein.

The measuring device 100 in accordance with Embodiment 2 measures a first zero point (S11). The first zero point is a value obtained by an electronic balance 3 carrying out weight measurement after preheating of a furnace 1 (S1) and before placement of the sample tray 90.

A flow of a subsequent process from when the user sets the sample tray 90 to S5 is the same as that in Embodiment 1. After an operation in S5, the user takes out the sample tray 90, and then the measuring device 100 in accordance with Embodiment 2 measures a second zero point (S12). The second zero point is a value obtained by the electronic balance 3 carrying out weight measurement after completion of heating of the sample tray 90 in S4 and after removal of the sample tray 90 from the furnace 1. A control section 10 obtains the value of the measured weight. More specifically, the second zero point in Embodiment 2 is a value obtained by the electronic balance 3 carrying out the weight measurement in a state where a sample stage 42, from which the sample tray 90 has been removed after the completion of the heating of the sample tray 90 in S4, is housed in the furnace 1.

When the weight measurement ends, the control section 10 corrects measured values with use of the first zero point and the second zero point and calculates a loss on ignition (S13). For example, the control section 10 can correct the loss on ignition with use of the first zero point (result of the measurement in S11) and the second zero point after the heating (zero point in S12), by changing the foregoing Equation 1 to the following Equation 2.

Loss on ignition (%)=[{(weight measured in S3−first zero point)−(weight measured in S5−second zero point)}/{(weight measured in S3−first zero point)−(weight measured in S2−first zero point)}]×100    [Equation 2]

According to the above process, in a case where the first zero point and the second zero point each indicate a value other than 0 (i.e., the electronic balance 3 has a measurement error), it is possible to eliminate such an error by correcting the error. Therefore, it is possible to more accurately measure a loss on ignition.

Note that a parameter calculated in S13 is also not limited to a loss on ignition, as with the parameter calculated in S6. In S13, the measuring device 100 may calculate at least a loss of the weight of foundry sand due to heating or a parameter which can be calculated on the basis of the loss.

[Variation]

The measuring device 100 in accordance with each of Embodiments 1 and 2 may be used for a purpose other than calculation of a loss on ignition. For example, the measuring device 100 described in each of Embodiments 1 and 2 may measure or calculate the other parameter, instead of or in addition to measuring a loss on ignition. As used herein, the term "other parameter" refers to a parameter (e.g., moisture or water content) calculated on the basis of the weight of a sample before and after heating.

In each of Embodiments 1 and 2, the control section 10 considers that the operation in S4 (heating of the sample tray 90 with the foundry sand therein) has been completed, in a case where the furnace 1 has carried out heating at a given temperature for a given time. However, a measuring device in accordance with an embodiment of the present disclosure may determine, by the other method, that heating of a sample tray 90 with foundry sand therein has been completed. For example, a control section 10 may continue to measure the weight of the sample tray 90 with the foundry sand therein, at given time intervals after the heating of the sample tray 90 with the foundry sand therein has been started in S4. When a change in weight of the sample tray 90 with the foundry sand therein falls within a given threshold range, the control section 10 may determine that the heating of the sample tray 90 with the foundry sand therein has been completed.

The measuring device 100 in accordance with each of Embodiments 1 and 2 may be configured such that, instead of the furnace 1 being raised and lowered, the measurement target object (i.e., the sample 91 and/or the sample tray 90) is brought close to and/or separated from the furnace 1. Alternatively, the furnace 1 and the measurement target object may be brought close to and/or separated from each other.

[Software Implementation Example]

The function of the control section 10 can be realized by a program for causing a computer to function as the control section 10, the program causing the computer to function as each control block of the control section 10.

In this case, the control section 10 includes, as hardware for executing the program, a computer which includes at least one control device (e.g., processor) and at least one storage device (e.g., memory). By the control device and the storage device executing the program, each function described in each of Embodiments 1 and 2 is realized.

The present disclosure is not limited to the above embodiments, but can be altered by a skilled person in the art within the scope of the claims. The present disclosure also encompasses, in its technical scope, any embodiment derived by combining technical means disclosed in differing embodiments.

The invention claimed is:

1. A measuring device which heats a measurement target object and which measures a weight of the measurement target object before heating and measures the weight of the measurement target object after the heating, comprising:
 a furnace which heats the measurement target object;
 a moving mechanism which moves the furnace;
 a plate on which the measurement target object is placed and which moves in a direction perpendicular to a direction in which the furnace is moved;
 a support which supports the measurement target object that has been transferred from the plate to the support during movement of the furnace; and
 a measuring section which measures the weight of the measurement target object,
 the moving mechanism moving the furnace so that the measurement target object which is supported by the support is housed in the furnace.

2. The measuring device as set forth in claim 1, wherein the moving mechanism moves the furnace so that the measurement target object which is supported by the support is housed in the furnace together with at least a portion of the support.

3. The measuring device as set forth in claim 1, further comprising:
 a movable frame which is slidable in the direction perpendicular to the direction in which the furnace is moved, wherein
 as the movable frame slides, the plate moves in the direction perpendicular to the direction in which the furnace is moved.

4. The measuring device as set forth in claim 1, wherein:
 the measurement target object includes foundry sand; and the weight of the measurement target object before and after the heating, which weight is measured by the measuring section, is used to calculate a loss on ignition.

5. The measuring device as set forth in claim 1, wherein:
the furnace has an opening in at least a given direction and has a function of heating a space inside the furnace at a set temperature; and
the moving mechanism moves the furnace so that the measurement target object is housed in the furnace through the opening.

6. The measuring device as set forth in claim 5, wherein:
the furnace is disposed such that the opening faces downward;
the support is disposed below the furnace; and
the moving mechanism lowers the furnace so that the measurement target object which is supported by the support is housed in the furnace.

7. The measuring device as set forth in claim 1, further comprising
a housing which covers the support, the furnace, the moving mechanism, and the measuring section,
the housing being provided with a partition plate which partitions an internal space of the housing into (i) a first space in which the furnace and the moving mechanism are disposed and (ii) a second space in which the measuring section is disposed,
the support being provided so as to pass through both the first space and the second space.

8. The measuring device as set forth in claim 7, further comprising:
a fan which is for discharging air inside the housing and which is provided to a portion of the housing, the portion being located on a first space side; and
an inlet which is for taking air into the housing from outside of the housing and which is provided to a portion of the housing, the portion being located on the first space side.

9. The measuring device as set forth in claim 1, further comprising
a control section,
the control section carrying out:
a measurement controlling step of controlling the measuring section to measure the weight of the measurement target object before the heating and measure the weight of the measurement target object after the heating;
a first measurement result obtaining step of obtaining, from the measuring section, the weight before the heating;
a second measurement result obtaining step of obtaining, from the measuring section, the weight after the heating; and
a calculating step of calculating, on the basis of the weight before and after the heating, a loss of the weight which loss results from the heating or a parameter which is based on the loss.

10. The measuring device as set forth in claim 9, wherein:
in a case where the measurement target object has been housed in the furnace, the control section controls the measuring section to measure the weight before the heating; and
in a case where the heating of the measurement target object has been completed, the control section controls the measuring section to measure the weight after the heating.

11. The measuring device as set forth in claim 9, wherein, in the calculating step, the control section corrects at least one of the weight before the heating and the weight after the heating, on the basis of a corresponding one of (i) a first zero point after preheating of the furnace and before placement of the measurement target object and (ii) a second zero point after the heating of and removal of the measurement target object.

12. A measuring device which heats a measurement target object and which measures a weight of the measurement target object before heating and measures the weight of the measurement target object after the heating, comprising:
a support which supports the measurement target object;
a furnace which heats the measurement target object;
a moving mechanism which moves the furnace;
a measuring section which measures the weight of the measurement target object; and
a control section,
the moving mechanism moving the furnace so that the measurement target object which is supported by the support is housed in the furnace,
the control section carrying out:
a measurement controlling step of controlling the measuring section to measure the weight of the measurement target object before the heating and measure the weight of the measurement target object after the heating;
a first measurement result obtaining step of obtaining, from the measuring section, the weight before the heating;
a second measurement result obtaining step of obtaining, from the measuring section, the weight after the heating; and
a calculating step of calculating, on the basis of the weight before and after the heating, a loss of the weight which loss results from the heating or a parameter which is based on the loss, wherein
in the calculating step, the control section corrects at least one of the weight before the heating and the weight after the heating, on the basis of a corresponding one of (i) a first zero point after preheating of the furnace and before placement of the measurement target object and (ii) a second zero point after the heating of and removal of the measurement target object.

13. A measuring device which heats a measurement target object and which measures a weight of the measurement target object before heating and measures the weight of the measurement target object after the heating, comprising:
a support which supports the measurement target object;
a furnace which heats the measurement target object;
a moving mechanism which moves the furnace;
a measuring section which measures the weight of the measurement target object; and
a housing which covers the support, the furnace, the moving mechanism, and the measuring section,
the moving mechanism moving the furnace so that the measurement target object which is supported by the support is housed in the furnace,
the housing being provided with a partition plate which partitions an internal space of the housing into (i) a first space in which the furnace and the moving mechanism are disposed and (ii) a second space in which the measuring section is disposed, the support being provided so as to pass through both the first space and the second space.

* * * * *